United States Patent [19]

Togawa et al.

[11] Patent Number: 5,618,607

[45] Date of Patent: Apr. 8, 1997

[54] PLASTIC-MADE REINFORCED STRUCTURE

[75] Inventors: Yoshiaki Togawa, Ichihara; Masahito Matsumoto, Ibaraki; Makoto Nagata; Tohru Yabe, both of Ichihara, all of Japan

[73] Assignee: Sumitomo Chemical Company, Limited, Japan

[21] Appl. No.: 428,456

[22] Filed: Apr. 25, 1995

Related U.S. Application Data

[63] Continuation-in-part of Ser. No. 325,601, Oct. 19, 1994, abandoned.

[30] Foreign Application Priority Data

Oct. 21, 1993 [JP] Japan ..................... 5-263505

[51] Int. Cl.$^6$ ..................... B32B 7/00
[52] U.S. Cl. ............ 428/119; 52/177; 428/120; 428/131; 428/137; 428/138; 428/188; 428/212; 428/213; 428/220
[58] Field of Search ..................... 428/119, 120, 428/131, 137, 138, 188, 213, 212, 220; 52/177

[56] References Cited

U.S. PATENT DOCUMENTS

| | | | |
|---|---|---|---|
| 3,235,438 | 2/1966 | Wisotzky | 428/92 |
| 4,050,756 | 9/1977 | Moore | 428/119 |
| 4,601,936 | 7/1986 | Ghavamikia | 428/119 |
| 4,631,221 | 12/1986 | Disselbeck et al. | 428/166 |
| 5,234,738 | 8/1993 | Wolf | 428/119 |
| 5,364,686 | 11/1994 | Disselbeck et al. | 428/174 |

FOREIGN PATENT DOCUMENTS

| | | |
|---|---|---|
| 0158234 | 10/1985 | European Pat. Off. . |
| 0512431 | 11/1992 | European Pat. Off. . |
| 2325503 | 4/1977 | France . |
| 3735464 | 5/1989 | Germany ............... 428/119 |
| 7-164566 | 6/1995 | Japan . |
| 902272 | 8/1962 | United Kingdom ........ 428/19 |
| WO9304858 | 3/1993 | WIPO . |

*Primary Examiner*—Nasser Ahmad
*Attorney, Agent, or Firm*—Cushman Darby & Cushman Intellectual Property Group of Pillsbury Madison & Sutro, LLP

[57] ABSTRACT

A plastic-made reinforced structure comprising a thermoplastic resin-made plate and cylindrical hollow rib(s) made of the same resin as that of said plate, connected to at least one side of said plate perpendicularly to the side so that the plate and the rib(s) form one piece, in which structure the following relationships hold:

$d_1 \geq 20$ mm, $1 > d_1/d_2 \geq 0.7$, $H \geq 30$ mm, $1 \geq d_1/H \geq 0.3$, and $1 > t_1/t_2 > 0.3$ wherein $d_1$ and $d_2$ are the inside and outside diameters of each rib at the root of the rib, i.e. the joint of the rib to the plate; H is the length of each rib from the root to the front end; and $t_1$ and $t_2$ are the rib thicknesses at the front end and at the root.

2 Claims, 2 Drawing Sheets

(UNIT : mm)

5,618,607

PLASTIC-MADE REINFORCED STRUCTURE

CROSS-REFERENCE TO RELATED APPLICATIONS

This is a continuation-in-part of U.S. application Ser. No. 08/325,601 filed on Oct. 19, 1994 now abandoned.

BACKGROUND OF THE INVENTION

1. Field of the Invention

The present invention relates to a plastic-made reinforced structure which is lightweight and yet has excellent strength.

2. Related Art Statement

Plastic plates have been in wide use as a structural material for various applications, owing to their light weight and excellent physical properties. They, however, are inferior in static or impact strength when used in the form of a flat plate; in order to reinforce the strength, it is often conducted to bond rib(s) to the surface of the plate. As typical examples of the rib(s)-bonded plate, there are known reinforced structures comprising (a) a plate and (b) continuous or independent rectangular box-shaped or honeycomb-shaped ribs bonded to the plate surface.

OBJECT AND SUMMARY OF THE INVENTION

In recent years, these reinforced structures have been required to be lightweight. Reduction in amount of resin used for rib portion in order to achieve a light weight, however, results in a reinforced structure of low strength because the amount of resin used for rib portion is approximately proportional to the static and impact strengths of reinforced structure. Thus, it has been an important task to develop a reinforced structure of light weight without reducing its strength.

Hence, the present inventors made study in order to develop a plastic-made reinforced structure which is free from the problems of conventional plastic-made reinforced structures and wherein the amount of resin used for rib portion is reduced for a light weight and yet the strength is the same as or even higher than those of conventional plastic-made reinforced structures. As a result, the present invention has been completed.

The present invention provides a plastic-made reinforced structure comprising a thermoplastic resin-made plate and cylindrical hollow rib(s) made of the same resin as that of said plate, connected to at least one side of said plate perpendicularly to the side so that the plate and the rib(s) form one piece, in which structure the following relationships hold:

$d_1 \geq 20$ mm, $1 > d_1/d_2 \geq 0.7$, $H \geq 30$ mm, $1 \geq d_1/H \geq 0.3$, and $1 > t_1/t_2 \geq 0.3$ wherein $d_1$ and $d_2$ are the inside and outside diameters of each rib at the root of the rib, i.e. the joint of the rib to the plate; H is the length of each rib from the root to the front end; and $t_1$ and $t_2$ are the rib thicknesses at the front end and at the root.

BRIEF DESCRIPTION OF THE DRAWINGS

In FIG. 1, A is a top plate and B is individual cylindrical hollow ribs.

In FIG. 2, each number indicates a length (mm); D is the rib diameter between the rib thickness centers; $d_1$ and $d_2$ are the inside and outside diameters of each rib at the root of each rib, i.e. the joint of the rib to the plate; H is the length of each rib from the root to the front end; T is the thickness of the top plate; and $t_1$ and $t_2$ are the rib thicknesses at the front end and at the root.

In FIG. 3, a is a top plate and b is individual box-shaped hollow ribs.

DETAILED DESCRIPTION OF THE INVENTION

Figure 1:
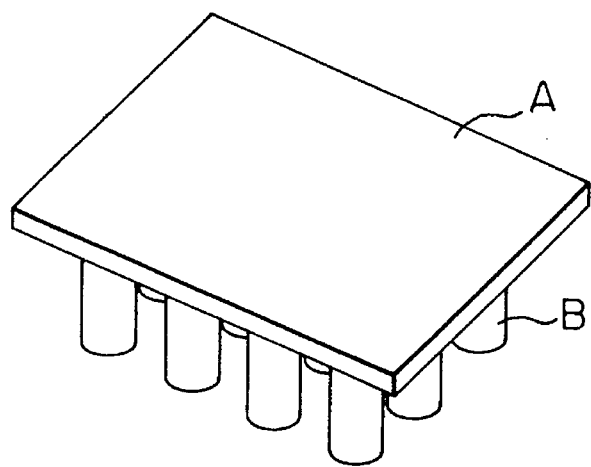
FIG. 1 shows a plastic-made reinforced structure having cylindrical hollow ribs, according to the present invention.

The present invention is described in detail below.

In the plastic-made reinforced structure of the present invention, the base material is a thermoplastic resin. The thermoplastic resin is exemplified by polyethylene, polypropylene, polyvinyl chloride, nylon, polycarbonate, polyethylene terephthalate, PMMA, ABS resin, modified resins thereof, polymer alloys, mixtures between one of said resins and a rubber component (e.g. thermoplastic elastomer typified by EPDM), and mixtures thereof. Among these resins, preferable are polyolefin resins such as homopolymers of ethylene, propylene, etc. or copolymers of said monomer and other copolymerizable component, and particularly preferable is a polypropylene resin.

Such a thermoplastic resin as the base material may be mixed with a fiber (e.g. glass fiber, carbon fiber or polyamide fiber) and a filler (e.g. talc) optionally. Needless to say, to the resin may be added various additives ordinarily used, such as antioxidant, ultraviolet absorber, flame retardant, coloring agent and the like.

The plastic-made reinforced structure of the present invention uses the above-mentioned thermoplastic resin as the base material, and comprises a thermoplastic resin-made plate and cylindrical hollow rib(s) connected to at least one side of the plate perpendicularly to the plate surface so that the plate and the rib(s) form one piece. It is requisite that the thermoplastic resin-made place which is the base of the structure (said plate is hereinafter referred to simply as base plate, in some cases) and the cylindrical hollow rib(s) for reinforcement are both made of the same material and that the base plate and the cylindrical hollow rib(s) are connected so as to form one piece. The plastic-made reinforced structure of the present invention is produced by a method which comprises forming a base plate and rib(s) simultaneously in one piece, for example, a press-molding method which comprises feeding a molten thermoplastic resin into between male and female dies each designed in a given shape and then clamping the dies or conducting feeding and clamping simultaneously, and an injection-molding method which comprises injecting a molten resin into a die. Any structure produced by bonding a base plate and rib(s) separately prepared, by fusion or with an adhesive is inferior in mechanical strengths and is not included in the plastic-made reinforced structure of the present invention.

In the plastic-made reinforced structure of the present invention, the shape of the base plate can be selected freely so as to best meet the application purpose of the structure. The base plate may have a flat surface or a curved surface and its shape is determined entirely depending upon the application purpose of the structure.

The cylindrical hollow rib(s) is (are) generally connected to one side of the base plate but, depending upon the application purpose of the structure, it (they) may be connected partially to the both sides of the base plate.

In the present plastic-made reinforced structure, it is requisite that the cylindrical hollow rib(s) is (are) connected to the base plate so that the lengthwise direction of rib(s) are perpendicular to the surface of the base plate.

Herein, "perpendicular to the surface of the base plate" means the followings. That is, when the surface of the base plate is a flat surface, said expression means that the lengthwise direction of each rib intersects the flat surface at right angles; and when the surface of the base plate is a curved surface, said expression means that the lengthwise direction of each rib is normal to the curved surface, or intersects the tangent of the curved surface with which each rib contacts, at right angles.

In the above, "perpendicular" need not be very strict and may deviate from true "perpendicular" as long as the strength of the structure is not greatly impaired.

In the present plastic-made reinforced structure, it is a very important requirement that the rib(s) bonded to the base plate has (have) a cylindrical hollow shape.

Herein, "cylindrical hollow rib" refers to a hollow rib whose cross-section intersecting the lengthwise direction of rib at right angles has a double-circle shape. These circles are preferably true circles but may slightly deviate therefrom to, for example, an oval as long as the strength of the structure is not greatly impaired.

In the present plastic-made reinforced structure, the relationships between the size and thickness of each rib is very important. That is, the following relationships must hold:

$d_1 \geq 20$ mm, $1 > d_1/d_2 \geq 0.7$, $H \geq 30$ mm, $1 \geq d_1/H \geq 0.3$, and $1 > t_1/t_2 > 0.3$ wherein $d_1$ and $d_2$ are the inside and outside diameters of each rib at the root of the rib, i.e. the joint of the rib to the plate; H is the length of each rib from the root to the front end; and $t_1$ and $t_2$ are the rib thicknesses at the front end and at the root.

$d_1$ smaller than 20 mm is not preferable because the resulting strength is small. The upper limit of $d_1$ is not particularly restricted. $d_1$ may vary depending upon the size of base plate, etc. $d_1$, even when too large, gives a low reinforcement effect in some cases; therefore, the upper limit of $d_1$ is generally about 80 mm, preferably about 60 mm.

When the ratio of the inside diameter and outside diameter of each rib, i.e. $d_1/d_2$ is smaller than 0.7, the thickness of each rib is larger than necessary as compared with the size of each rib, which results in increased weight of structure and fails to achieve a light weight. As the ratio $d_1/d_2$ approaches 1, the thickness of each rib becomes smaller. Too small a rib thickness, however, gives a low reinforcing effect; therefore, the ratio $d_1/d_2$ is preferably 0.98 or smaller.

The rib thickness ($t_1$) at the front end is smaller than the rib thickness ($t_2$) at the root, and the ratio of $t_1$ and $t_2$, i.e. $t_1/t_2$ is more than 0.3. Namely, the ratio $t_1/t_2$ is $1 > t_1/t_2 > 0.3$, preferably, $1 > t_1/t_2 \geq 0.4$. When the ratio $t_1/t_2$ is in this range, it is preferable because of the excellent productional advantage, and the excellent impact absorption and yield strength of the structure.

It is preferable that the thickness of the rib decreases continuously from the root to the front end.

The present plastic-made reinforced structure shows an excellent reinforcing effect when it is a comparative large structure, i.e., H is 30 mm or more. Further, in the relationships between H and $d_1$ (the inside diameter of each rib), $1 \geq d_1/H \geq 0.3$ gives an excellent reinforcing effect. The ratio $d_1/H$ is preferably $1 \geq d_1/H \geq 0.4$, and more preferably $1 \geq d_1/H \geq 0.5$.

The thickness (T) of the thermoplastic resin-made plate and the thickness ($t_2$) of the rib at the root $[t_2=(d_2-d_1)/2]$ is preferably $15 \geq T \geq 1$ (mm) and $1.5 \geq t_2/T$, and more preferably $10 \geq T \geq 2$ (mm) and $0.8 \geq t_2/T$.

The number of ribs is at least one and generally two or more depending upon the size of the base plate. The number of ribs, the distance between ribs and the position of each rib are determined appropriately depending upon the size and shape of the base plate and the design strength of the reinforced structure to be produced.

The height, diameters and thickness of each rib are determined appropriately based on the respective design values which vary depending upon the application purpose of the reinforced structure, and accordingly are not particularly restricted.

Any auxiliary ribs connecting the cylindrical hollow ribs may be provided as necessary, whereby a further reinforcing effect can be obtained.

The plastic-made reinforced structure of the present invention, as compared with conventional structures having rectangular box-shaped hollow rib(s), can exhibit higher mechanical strengths at the same resin amount and can be used as a structure of light weight and yet excellent strength.

PREFERRED EMBODIMENTS OF THE INVENTION

The present invention is hereinafter described by way of Examples. However, the present invention is not restricted to these Examples.

Example 1

Figure 2:
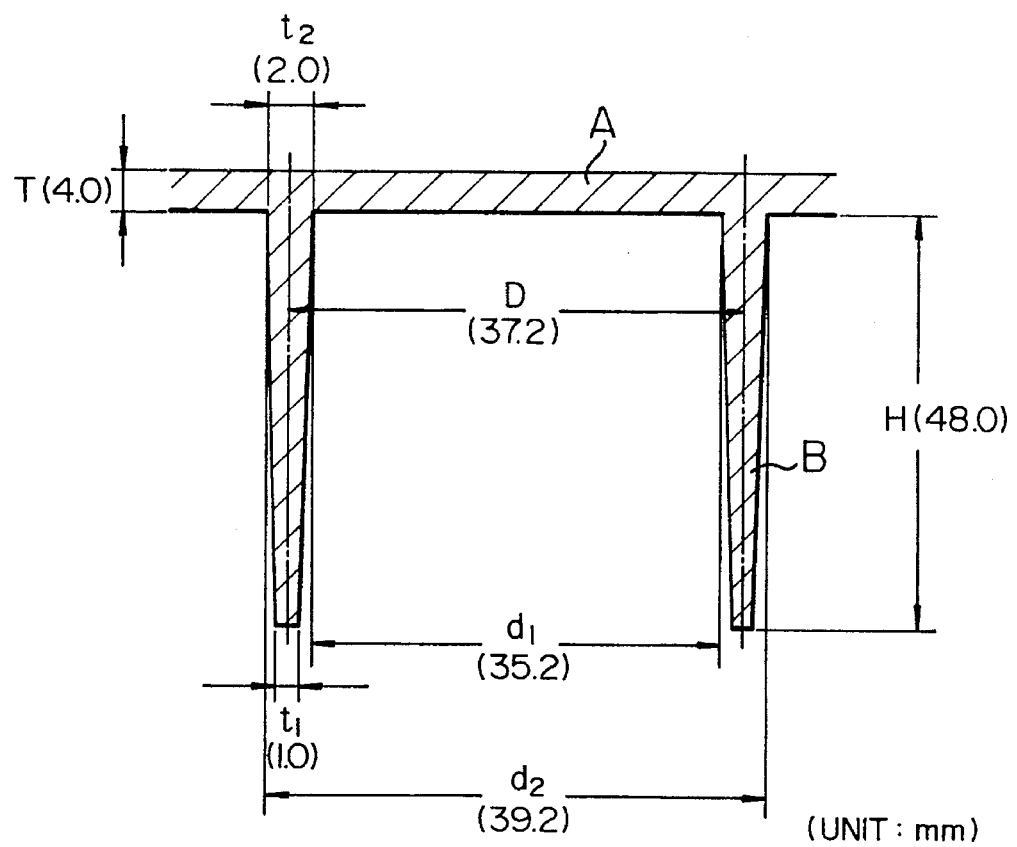
FIG. 2 shows the sectional view of each rib of the structure of FIG. 1.

A polypropylene resin (Sumitomo Noblen AH 561, a product of SUMITOMO CHEMICAL CO., LTD.) of molten state was fed into the two dies of a press molding machine comprising male and female dies, while the two dies were in an open state. Then, clamping and cooling were applied in this order, whereby was obtained a plastic-made reinforced structure as shown in FIG. 1, which comprised a rectangular top plate (A) of 300 mm×400 mm×4 mm (thickness: T) and 12 cylindrical hollow ribs (B) having a double-circle cross-sectional shape, connected perpendicularly to the plate (A), the ribs (B) being arranged at equal intervals in three rows each consisting of four ribs. The cross section of each rib of the structure is shown in FIG. 2.

In the structure, the rib thickness ($t_2$) at the root was 2.0 mm; the rib thickness ($t_1$) at the front end was 1.0 mm ($t_1/t_2$=0.50); the rib diameter (D) between the rib thickness centers was 37.2 mm; the rib height (H) was 48 mm; the ratio ($d_1/d_2$) of the rib inside diameter and the rib outside diameter was 0.90; and the ratio ($d_1/H$) of the rib inside diameter and the rib height was 0.73.

The resin amount of the structure was such that the resin amount of the top plate was 360 g, the resin amount of each one rib was 7.18 g and the total resin amount was 446 g.

The structure was placed on a flat iron plate so that the front end of each rib contacted with the iron plate. A pressure was applied uniformly to the whole area of the top plate of the structure from above the top plate towards the ribs at a rate of 100 mm per minute, to measure the primary buckling strength of the structure. The yield load of the structure was 2,310 kgf.

The result is shown in Table 1.

Examples 2–3 and Comparative Example 1

In the same manner as in Example 1, there were obtained plastic-made reinforced structures having the dimensions shown in Table 1.

The yield load of the structures were measured in accordance with the same manner as in Example 1.

The results are shown in Table 1.

Comparative Example 2

Figure 3:
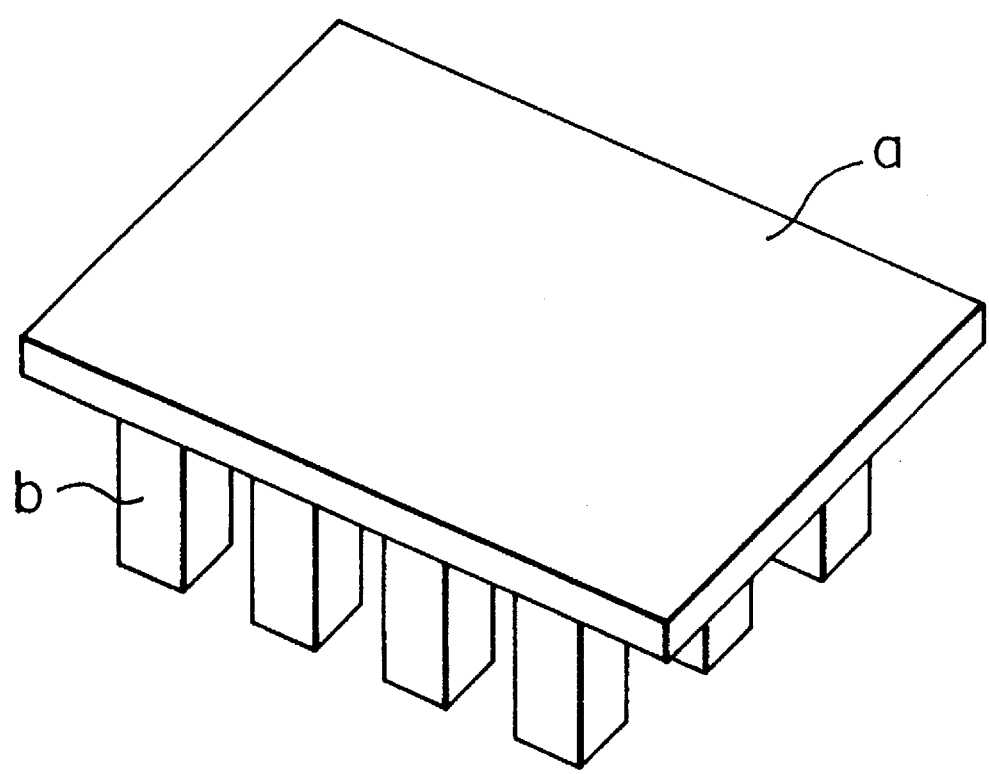
FIG. 3 shows a plastic-made reinforced structure having box-shaped hollow ribs.

In the same manner as in Example 1, there was obtained a plastic-made reinforced structure as shown in FIG. 3, which comprised a rectangular top plate (a) of 300 mm×400 mm×4 mm (thickness) and 12 box-shaped hollow ribs (b) having a square cross section, connected perpendicularly to the plate (a), the ribs (b) being arranged at equal intervals in three rows each consisting of four ribs.

In the structure, the rib thickness at the root was 3 mm; the rib thickness at the front end was 0.5 mm; the distance between the rib thickness centers was 25 mm; and the rib height was 48 mm.

The resin amount of the structure was such that the resin amount of the top plate was 368 g, the resin amount of each one rib was 7.25 g and the total resin amount was 455 g.

The structure was measured for primary buckling strength in the same manner as in Example 1. The yield load of the structure was 950 kgf.

As compared with Examples 1–3 and Comparative Examples 1–2, even each structure has approximately a same total resin amount (W), the plastic-made reinforced structure of the present invention remarkably shows an excellent yield load and gives an excellent effect for a plastic-made reinforced structure.

Especially, as compared with Examples 1–3 and Comparative Example 1, even each structure has approximately a same total resin amount (W), the plastic-made reinforced structures of Examples 1–3 remarkably show more than 50% improvements of the yield load of Comparative Example 1, which is not within the scope of the present invention in respect to the ratio $t_1/t_2$. Said ratio $t_1/t_2$ is one of important design indices when the structure is designed.

Accordingly, the inventive step of the present invention was proved.

TABLE 1

| Example | $d_1$ (mm) | $d_2$ (mm) | $t_1$ (mm) | $t_2$ (mm) | D (mm) | H (mm) | $t_1/t_2$ | $d_1/d_2$ | $d_1/H$ | P (g) | w (g) | W (g) | L (kgf) |
|---|---|---|---|---|---|---|---|---|---|---|---|---|---|
| Example 1 | 35.2 | 39.2 | 1.00 | 2.00 | 37.2 | 48.0 | 0.50 | 0.90 | 0.73 | 360 | 7.18 | 446 | 2310 |
| Example 2 | 29.3 | 34.3 | 1.00 | 2.50 | 31.8 | 48.0 | 0.40 | 0.85 | 0.61 | 361 | 7.18 | 447 | 2160 |
| Example 3 | 30.0 | 35.0 | 1.00 | 2.50 | 32.5 | 48.0 | 0.40 | 0.86 | 0.63 | 362 | 7.19 | 448 | 2020 |
| Comparative Example 1 | 28.8 | 34.5 | 0.50 | 3.00 | 31.6 | 48.0 | 0.17 | 0.83 | 0.60 | 361 | 7.19 | 447 | 1330 |

$d_1$: The rib inside diameter (mm)
$d_2$: The rib outside diameter (mm)
$t_1$: The rib thickness at the front end (mm)
$t_2$: The rib thickness at the root (mm)
D: The rib diameter between the rib thickness centers (mm)
H: The rib height (mm)
P: The resin amount of the top plate (g)
w: The resin amont of each one rib (g)
W: The total resin amont of the structure (g)
L: The yield load of the structure (kgf)

What is claimed is:

1. A plastic-made reinforced structure comprising a plate made of a thermoplastic resin and at least one cylindrical hollow rib made of the same resin as that of said plate, connected to at least one side of said plate perpendicularly to the side so that the plate and at least one rib form one piece, in which structure the following relationships hold:

$80 \geq d_1 \geq 20$ mm, $0.98 > d_1/d_2 \geq 0.7$, $H \geq 30$ mm, $1 \geq d_1/H \geq 0.5$, and $1 > t_1/t_2 \geq 0.4$ [>0.3]

wherein $d_1$ and $d_2$ are the inside and outside diameters of each rib at the root of the rib, i.e., the joint of the rib to the plate; H is the length of each rib from the root to the front end; and $t_1$ and $t_2$ are the rib thicknesses at the front end and at the root; and wherein said thermoplastic resin is selected from the group consisting of polyethylene, polypropylene, polyvinyl chloride, nylon, polycarbonate, polyethylene terephthalate, [PMMA] polymethyl methacrylate, [ABS] acrylonitrile-butadiene-stylene copolymer resin, mixtures between one of said resins and a rubber component, and mixtures thereof.

2. A plastic-made reinforced structure according to claim 1, wherein the $d_1$ is as follows:

$60 \geq d_1 \geq 20$ mm.

* * * * *